Sept. 19, 1967 C. B. KREKELER 3,342,531
CONICAL CUTTER BITS HELD BY RESILIENT
RETAINER FOR FREE ROTATION
Filed Feb. 16, 1965 3 Sheets-Sheet 1

Inventor
CLAUDE B. KREKELER,
By Youngblut, Melville,
Strasser & Foster,
Attorneys Sept. 19, 1967
C. B. KREKELER
3,342,531
CONICAL CUTTER BITS HELD BY RESILIENT
RETAINER FOR FREE ROTATION
Filed Feb. 16, 1965
3 Sheets-Sheet 2
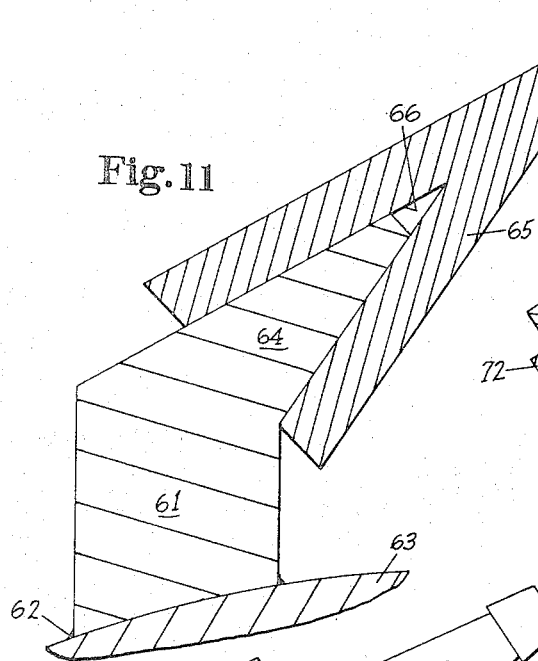
Fig. 11
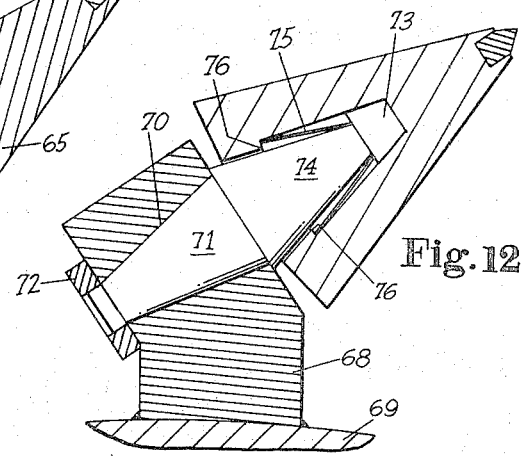
Fig. 12
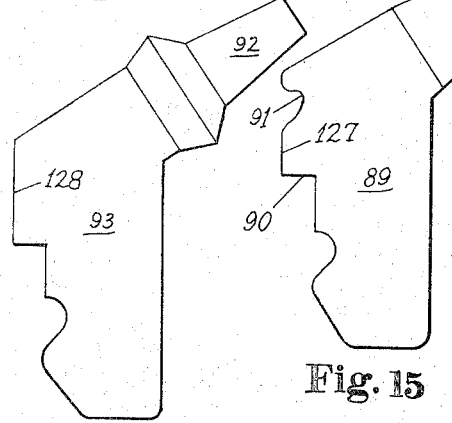
Fig. 15
Fig. 16
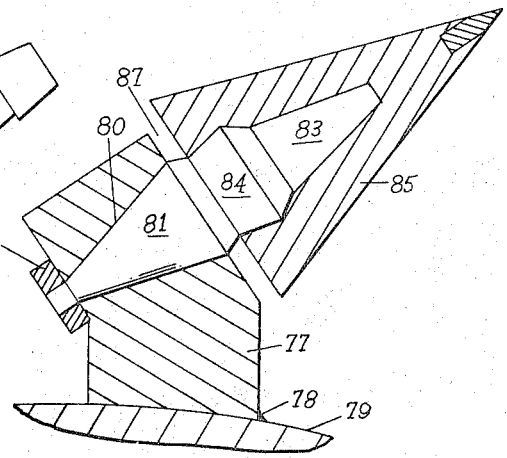
Fig. 13
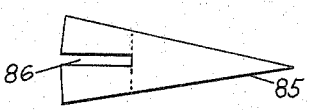
Fig. 14
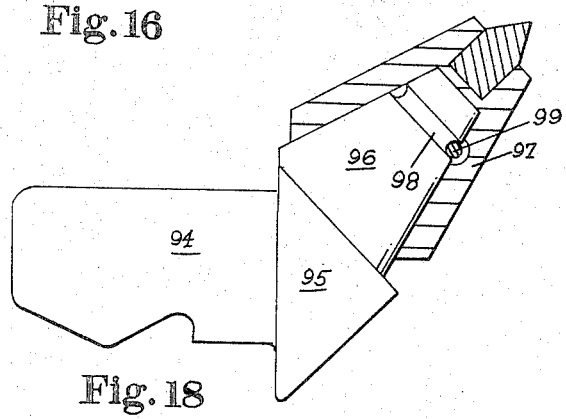
Fig. 18
INVENTOR.
CLAUDE B. KREKELER,
BY Jungblut, Melville,
Strasser & Foster,
ATTORNEYS.

Sept. 19, 1967     C. B. KREKELER     3,342,531
CONICAL CUTTER BITS HELD BY RESILIENT
RETAINER FOR FREE ROTATION
Filed Feb. 16, 1965     3 Sheets-Sheet 3
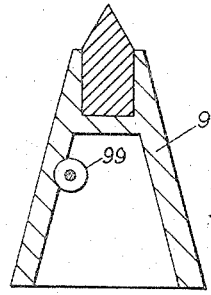
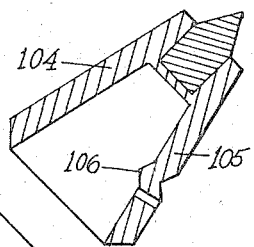
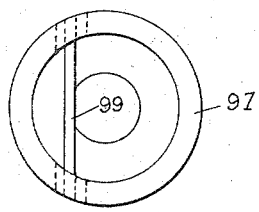
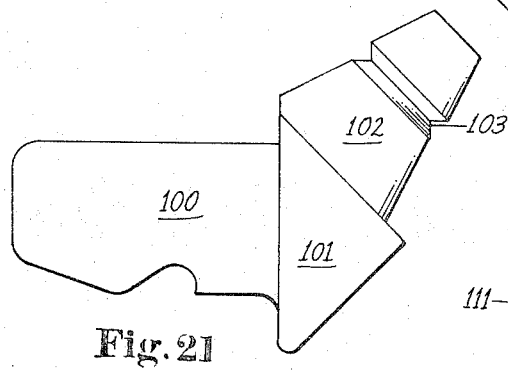
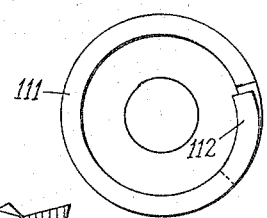
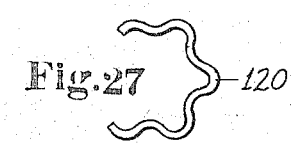
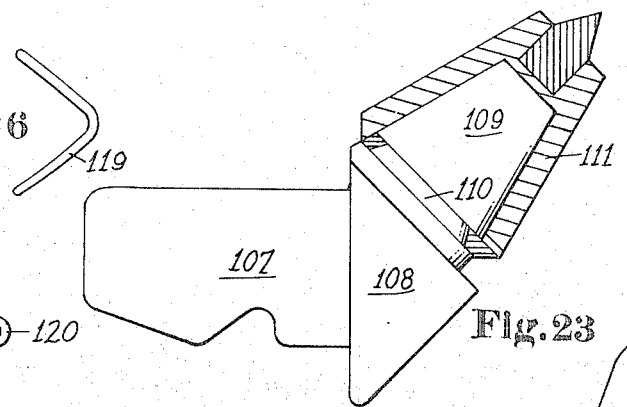
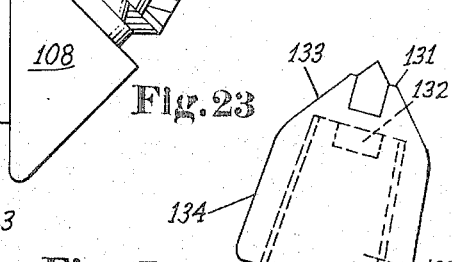
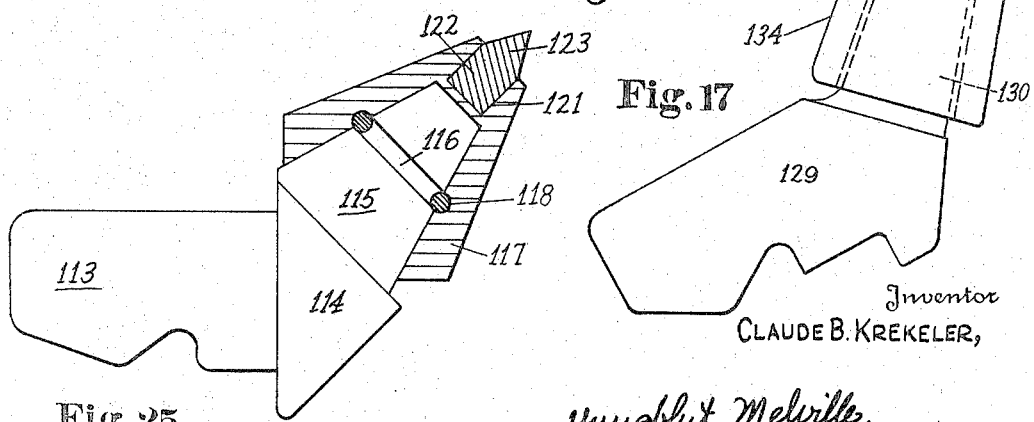
Inventor
CLAUDE B. KREKELER,
By Yungblut, Melville,
Strasser + Foster,
Attorneys United States Patent Office 3,342,531
Patented Sept. 19, 1967

3,342,531
CONICAL CUTTER BITS HELD BY RESILIENT RETAINER FOR FREE ROTATION
Claude B. Krekeler, Hamilton County, Ohio, assignor to The Cincinnati Mine Machinery Co., Cincinnati, Ohio, a corporation of Ohio
Filed Feb. 16, 1965, Ser. No. 432,981
16 Claims. (Cl. 299—92)

ABSTRACT OF THE DISCLOSURE

A heavy duty cutter bit for mining machines or the like comprising a head element substantially conical in shape and terminating in a cutting point. A motion imparting element is provided for moving the bit against the face of the material to be cut. A supporting element maintains the head element in a position such that its axis lies at an angle of less than 90° to the direction of motion of the head element. A snap-in, pry-out connection exists between at least any two of these elements, i.e., the head element, the motion imparting element and the supporting element.

---

This application has to do with mining machinery wherein, as is well known, driven elements are provided with socket members (hereinafter called lugs) serving to support cutting tools and move them against the face of a seam of coal or other mineral to be mined. A number of years ago it was the fashion to mount the lugs on cutter chains which were driven about a cutter arm extending from the front portion of the mining machine. Such a structure was used to undercut a seam of coal so that it could be blown down from above by suitable charges of explosive. It was then loaded by hand onto conveyors or into mine cars.

In more recent years, the mining of coal or other minerals susceptible to similar treatment, has been greatly changed by the provision of heavy duty mining machines which operate directly upon the face of a seam of the mineral, comminute it and pass it through the machine and onto a conveyor or the like. Such heavy duty mining machines operate continuously during the mining operation, and the bits are subjected to heavier and more continuous strains.

Some of the more modern mining machines have a horizontal shaft mounted on a boom at the front or cutting end of the machine. The shaft bears cutting wheels upon which the lugs are mounted, and the boom permits the cutting assembly to be swung from side-to-side and up-and-down. Other types of mining machinery are characterized by shaft means extending toward the face of the seam. Cutter arms bearing the lugs are mounted radially on the shafts, and the cutting bits bite directly into the face of the seam by moving across it. Cutter chains are sometimes used in connection with such machines to reach portions of the mineral which the cutters on the arms are unable to contact. Both types of the more modern heavy duty mining machines are adapted to cut their own entries in the mine.

The need of frequent bit changes has greatly increased in these continuously operated machines, and considerable work has been done in the art to provide lugs and cutter bits of such character that worn bits may be easily removed by a prying action and fresh or sharp bits easily installed by merely driving them in place. Naturally also, the nature of the cutting bits themselves has changed in the heavy duty direction. Many bits today are forgings comprising a head portion and a shank portion, the latter being of substantially smaller cross section than the head portion. A hard cutting tip such as a tip of Carboloy, is affixed to the bit head. Such bits may sometimes be resharpened one or more times; but when they have become worn out they are discarded or scrapped.

Nevertheless, and especially with the advent of heavy duty continuous mining machines, the wearing out of bits is not the only problem involved. There is much actual breakage of bits which not only ruins their effectiveness but also involves difficulties in contamination of the mineral being mined, and in disrupting the mining machine itself.

There is a distinct need for a better heavy duty cutter bit. It has hitherto been suggested that the shanks of cutter bits might be strengthened by increasing their cross section as by providing reinforcing ribs or by making the shank and a portion of the head of circular cross section. Under these circumstances special means have to be provided to maintain the orientation of the bit in the lug so as to keep the hard cutting point facing in the cutting direction.

Still more recently the art has shown interest in heavy duty cutter bits (sometimes known as "pick type bits," which although this term is not so confined) have a head of conical formation ending in a hard cutting point, and a shank having an axis substantially in line with the axis of the head. When the shanks of such bits are held in suitable socket members so configured that the movement of the bit heads in the cutting operation is at a relatively small angle to the axis of the head, better cutting characteristics result. Some of the bit breakage hitherto encountered has arisen from the fact that the stresses of cutting are applied to the bit in a direction substantially normal to the bit axis. This can be avoided in bits of the type herein described; but the art has not hitherto provided any rapid and easy way in which the shanks of such bits may be removed from the socket members and fastened into the socket members when bit changes are required. Specifically, there has not been provided any lug or bit structure in which pick type bits can be removed by a simple prying operation, and new ones installed by driving them into or onto the lugs or socket members. It is an object of this invention to provide means whereby quick and easy bit changes may be effected.

It is a general object also to provide improvements in the construction of pick type bits, many of which improvements result in lessened cost.

The formation of heavy duty cutter bits involving larger quantities of metal is a matter of expense whether or not breakage occurs. One of the objects of this invention is the provision of cutter bits which are double ended where desired so as to justify the cost of relatively large amounts of metal in the bit in view of the service life thereof.

It is an object of the invention to provide cutter bits which by reason of their construction are more durable than the heavy duty cutter bits hitherto available.

It is an object of the invention to provide improved holding means for accepting and moving the cutter bits above generally described.

Since the head portions of the bits are generally conical in configuration and are tipped with a hard cutting alloy, it is advantageous to change the position of the cutting bits by turning or rotating them by relatively slight angular increments during the cutting operation. It is an object of this invention to provide pick type bits and corresponding socket members which will permit a relative turning of the bits, as desired by the operator.

It is also an object of the invention to provide bits which in use have a tendency toward relative slow movement about the bit axis, since this causes the bits to wear more uniformly and to remain in cutting condition for a longer period of time.

These and other objects of the invention which will be set forth hereinafter or will be apparent to one skilled in the art upon reading these specifications, are accomplished by those constructions and arrangement of parts of which certain exemplary embodiments will now be described. Reference is made to the accompanying drawings wherein:

FIG. 11 is a partial sectional view of a type of bit and holding means.

FIG. 12 is an elevational view of yet another type of heavy duty cutter bit and mounting.

FIG. 13 is an elevational view of a bit and bit holder with parts in section.

FIG. 14 is a side elevational view of the bit of FIG. 13.

FIG. 15 is an elevational view of a shank element combined with a bit holder.

FIG. 16 is an elevational view of another type of bit holder and shank combination suitable for use in conventional socket members.

FIG. 17 is an elevational view of a bit having a different type of taper.

FIG. 18 shows a bit holder in elevation and a bit in section.

FIG. 19 is a sectional view of the bit of FIG. 18 showing more clearly a releasable engagement means incorporated in the bit.

FIG. 20 is a bottom end view of the bit of FIG. 19.

FIG. 21 is an elevational view of a bit holder of modified type.

FIG. 22 is a sectional view of a bit which may be used with the bit holder of FIG. 21.

FIG. 23 shows another bit holder in elevation with a bit shown in section.

FIG. 24 is a bottom end view of the bit of FIG. 23.

FIG. 25 shows yet another bit holder in elevation with a bit shown in section.

FIGS. 26 and 27 show in plan forms of spring wire clip elements usable with the bit of FIG. 25.

Briefly in practice of the invention cutter bits are provided having at least one portion of elongated conical configuration and at least one other portion which can be held in or on a socket member or bit holding means for mounting the bit in cutting position. In many instances the conical portion of the bit may have different degrees of taper. In many instances the bit may have two opposed conical portions of similar character; and in this event the bit may have a cutting point at each end, thus doubling its service life. The term "conical" is used herein as a broad term of reference whether or not the entire head portion of the bit has a single degree of taper.

The conical element of the bit (whether or not the bit has more than one conical element) is preferably so positioned by an adequate holding means that the axis of the conical portion will have an angularity to the rearward primary cutting strain of less than 90°, and preferably as small as possible. The cutting strain therefore is resisted basically in the direction of the greatest length of the cutting bit structure, thereby minimizing forces which would tend to produce transverse breakage. The apex of the conical portion performs the cutting operation is so located as to lie above the highest portion of the holding means so as to protect the holding means from wear against the face of the mineral being cut. The apex of the conical portion of the bit will normally be provided with a hard cutting point; and it is an advantage of the structures of this invention that this point can be made as large as desired within the limits of cost considerations.

While not illustrated herein in all instances, it will be understood that the lugs (where used) will usually be welded directly to the rims of cutting wheels or to cutting arms on heavy duty mining machines; but the bit and socket or holding structures described herein can be used as a part of the link elements of a cutting chain without departing from the spirit of this invention.

The problem of bit orientation is completely solved by a number of the bit and holder structures hereinafter described; and it is not necessary to provide any means for keeping the hard cutting point oriented in the cutting direction since this naturally results from the mode of mounting of the bit. Indeed, the bit can move or rotate, in or on the holder without interfering with the cutting operation; and such movement is advantageous because it tends to distribute wear on the conical portion of the bit.

Figure 1:
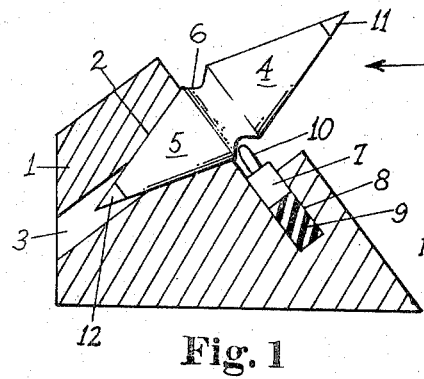
FIG. 1 is an elevational view of a cutter bit showing a socket member therefor in section.

One form of the invention is shown in FIG. 1. A socket member 1 can be thought of as mounted by welding on a cutting wheel or cutting arm of a modern heavy duty mining machine. The lug member is characterized by a conical bore 2 which is preferably carried through to the opposite end of the lug member in the form of a straight bore 3. This has two advantages. If the bit is a double ended bit, the cutting point which is not in service is not required to contact the lug member itself. Secondly, if a conical portion of the bit should become so tightly wedged in the conical bore of the lug as to be difficult to remove, it becomes possible to drive a drift pin through the opening 3 to loosen or remove the bit.

The particular bit embodiment shown in FIG. 1 comprises a first conical portion 4 and a second and oppositely directed conical portion 5. Between these two portions there may be an annular groove 6. To retain the bit against accidental removal, it is possible to provide a plunger 7 operating in a bore 8 in the lug member, against a body of resilient compressible substance 9. The plunger 7 has a nose 10 adapted to engage in the groove 6, for the purpose expressed above. The bit may be removed from the socket member by engaging a prying tool in the groove 6. If the coacting surfaces are properly configured this will automatically depress the plunger 7 and its nose 10 to disengage the bit.

It will be noted in FIG. 1 that the primary cutting stresses (in the direction of the arrow) lie at a relatively small angle to the axis of the bit, whereby the tendency of the bit toward transverse breakage is greatly reduced. The bit of FIG. 1 may have hard cutting points as shown at 11 and 12.

Figures 2, 6:
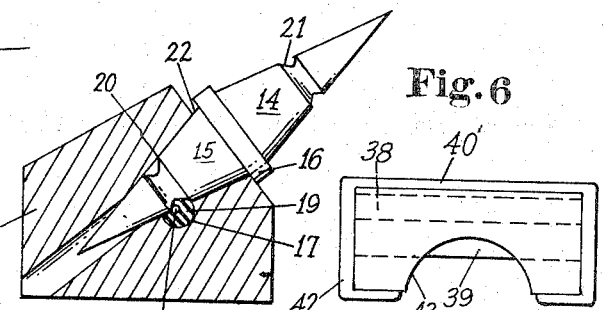
FIG. 2 shows in elevation another type of bit engaged in a socket member shown in section.
FIG. 6 is a plan view of one type of resilient retaining device.

Another form of structure is shown in FIG. 2 wherein the lug 13 is generally similar to that previously described. The bit has opposed conical sections 14 and 15 separated by an annular ridge 16. In the lug of FIG. 2 a bit holding means is provided similar to that shown in United States Letters Patent No. 2,965,365, dated Dec. 20, 1960, of the present inventor. To this end the lug is provided with a transverse hole 17 which contains a resilient holding device comprising a metallic rod 18 encased in a body of resilient substance 19, excepting upon one side at that portion where the rod traverses the conical bore in the lug. The portion of the rod 18 entering the conical bore engages in a groove 20 (or in a groove 21 if the bit is reversed).

The bit of FIG. 2 can be removed from the lug or socket member by a simple prying action, the tip of the prying tool being inserted in a space 22, between the annular shoulder 16 on the bit and a spaced face portion of the lug.

Figure 3:
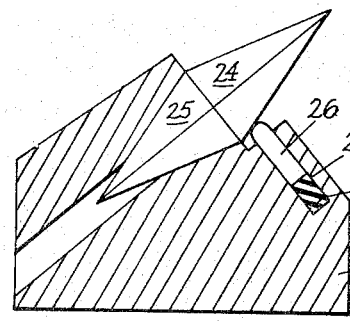
FIG. 3 is a similar view of yet another type of bit in a socket member shown in section.

In FIG. 3 there is shown a lug 23 having bores as previously described. The bit in this instance may consist of opposed conical portions 24 and 25 but without either ridges or grooves. The bit is shown as held in place against accidental removal by a plunger 26 operating in a bore 27 in the lug member against a body of resilient substance 28. The plunger 26 retains the bit because it engages the bit at a point beyond the base of the outer cone. While it is preferred to make the bits of this invention circular in cross section, this may be varied. Bits having square or diamond shaped cross sections, or cross sections corresponding to other regular polygons or other geometrical figures can be employed at some sacrifice of strength.

Figures 4, 5:
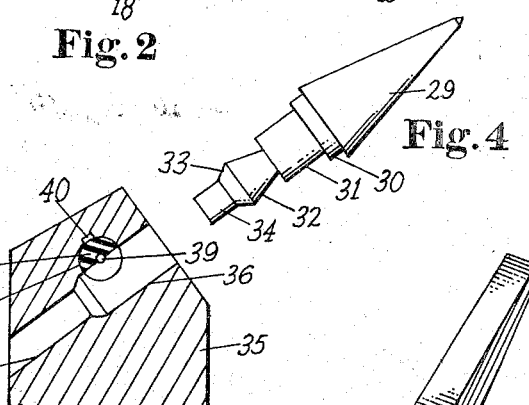
FIG. 4 is an elevational view of a single ended bit.
FIG. 5 is a sectional view of a socket member for accepting the bit of FIG. 4.

FIG. 4 shows a single ended bit characterized by an upper conical section 29 and a shank portion of generally lesser diameter. Between the conical head and the shank proper there is a portion 30 of somewhat lesser diameter than the diameter of the base of the cone. The portion 30 also has a greater diameter than the perforation in the lug or socket member hereinafter described, and it serves two purposes. One of these is a gauging purpose for determining how far the tip of the conical portion will extend beyond the face of the lug. The insetting of the edge of the portion 30 also permits insertion of a prying tool for the purpose of removing the bit. The shank proper consists of a first cylindrical portion 31, a second grooved portion 32, a tapered portion 33 (to deflect the rod of the resilient retaining means), and a final cylindrical portion 34 of lesser diameter than the portion 31.

The lug 35 for use with this bit, is shown in FIG. 5. It has a cylindrical bore 36 of a diameter to accept the cylindrical portion 31 of the bit of FIG. 4. A transverse hole 37 is bored in the lug member for the acceptance of the resilient retaining means of the patent above referred to. This resilient retaining means has a resilient body 38 and a metal rod 39 which is bare in that section of the retainer which intersects the perforation 36 in the lug. If the resilient retainer has a key 40 on its rear side, the hole 37 will be broached to accept the key as hitherto understood in the art. The cylindrical bore 36 preferably terminates in a cylindrical bore 41 of smaller diameter or of a size to accept the lower cylindrical portion 34 of the bit shank. When the bit shank is placed in the perforation 36, 41, the relieved portion 33 of the bit shank will depress the metal rod 39 until it can enter the groove 32, after which the bit shank will be firmly held in the socket member. Again the matter of orientation is of no consequence. The portion 30 gives a broad base for sustaining any stresses generally in the direction of the axis of the bit, and the structure will be found very strong and not liable to breakage.

FIG. 6, in which like parts have been given like index numerals, is a plan view of a form of resilient retainer such as that previously described. It carries a cage-like element 42 of metal which forms, inter alia, a key 40' for entering the keyway 40. FIG. 6 shows how the resilient body is cut away at 43 to expose the rod 39 for the coaction with the bit which has been described.

Figures 7, 9:
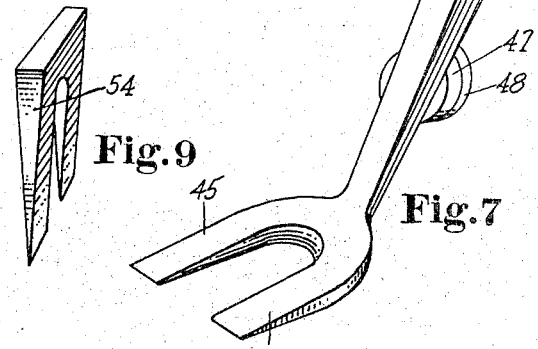
FIG. 7 is a perspective view of a tool which may be used in removing and replacing the bit of FIG. 4 in the socket member of FIG. 5
FIG. 9 is a perspective view of a drift device for removing the bit of FIG. 8 and others.

FIG. 7 shows a tool for removing and installing the bits of FIG. 4 in the lugs of FIG. 5. It comprises a handle 44 having at one end angularly related bifurcated portions 45, 46. These portions may be inserted between the base of the conical portion of the cutter bit and the face of the lug member, embracing the bit portion 30. A movement of the handle of the tool of FIG. 7 in either direction will exert a prying force on the bit resulting in its removal. On the rear side of the handle 44 there is welded a driving means comprising a metallic socket element 47 which contains a material 48 which is relatively soft as compared with the metal of the bit. Various materials can be used; but a body of rolled leather or rawhide will be found satisfactory. After the removal of a worn bit a fresh bit may have its shank inserted in the perforation 36, 41 and may be driven home by suitable means such as the driving element 47–48 on the tool of FIG. 7.

Figure 8:
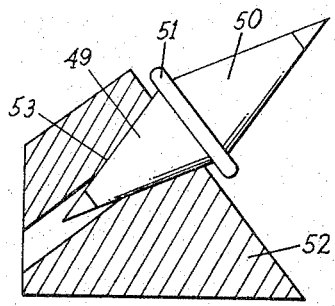
FIG. 8 shows yet another bit in elevation located in a socket member or lug which is shown in section.

FIG. 8 shows a simple form of bit characterized by opposed conical portions 49 and 50, and a central ridge member 51. It is intended to be held frictionally in a lug member 52 having a conical bore 53. A simple bifurcated drift (54 in FIG. 9) will remove the bit of FIG. 8 from its lug if driven downwardly between the face of the lug and the ridge member 51.

In the bit and socket constructions above described, the bits are capable of being turned or rotated either freely or forcibly with the advantage above set forth. It will be understood by those skilled in the art that when lugs and bits are installed upon chains, wheels or cutter arms of mining machinery (usually by welding the lugs to the driven elements which carry them) the lugs will be oriented at different angularities to the driven element so that the cutting points of the various bits will form a cut of sufficient width to permit the passage of the driven element to the extent desired. In the use of bits where the bit is rotatable and the axis of the bit is oriented at a lateral angle to the direction of motion of the bit, there will be a natural tendency for the bit to turn in the socket member. This action may also be accomplished by orienting the socket members of the center cutting bits at a slight lateral angle. The position of the cut formed by any bit will be determined by the position of its point. The slow movement or turning of the bit in its holder will make for more uniform wear, as has been explained.

Figure 10:
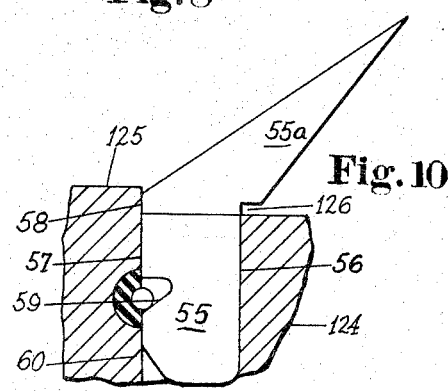
FIG. 10 is a view partly in elevation and partly in section, of another type of cutter bit and holding means.

It is possible, as shown in FIG. 10, to attach a conical head portion to a shank of conventional configuration.

It has been indicated above that the difficulty which leads to the breakage of conventional cutter bits is not alone a matter of light cross section. In the conventional bits, which have a head and a shank, the cutting point is located on the forward edge of the head substantially in line with the front edge of the shank, so that the primary cutting stresses lie in a direction substantially at a right angle to the axis of the bit. Consequently, the bit is subjected to heavy vibrational stresses in a direction which tends to shear the bit either in its shank portion or in its head portion, or between the two. In the light of the teachings of this application, however, it is possible to improve the service of bits having conventional shanks by modifying the heads thereof. In FIG. 10 there is shown a bit having a shank 55 with a front edge 56 and a rear edge 57. This shank may be thought of as rectangular in cross section with the greatest transverse dimension in the front-to-rear direction. Instead of the conventional head, the bit of FIG. 10 is shown as having an elongated and preferably conical head 55a, the axis of the cone extending usually at an angle of about 45° to the axis of the shank. The projecting lower edge of the cone is preferably cut off to form an abutment as at 58. The lateral projections of the conical head beyond the sides of the shank will serve as gauging abutments. But in order to avoid a shearing stress at the juncture of the head and shank, the bit of FIG. 10 is preferably used in a lug member 124 which is provided with an upstanding abutment 125 to engage the abtument surface 58. In FIG. 10 the lug is shown as provided with a resilient retainer such as has above been described. An undercut 126 at the front edge of the head provides a means for engagement of a prying tool to remove the bit.

The shank is shown as having a notch 59 for use with the type of resilient holder set forth in the patent mentioned herein, as well as a relieved edge 60 for depressing the metal rod of the resilient retainer of the patent recited above during the engagement of the bit.

All of the bits styles shown and described herein may have hard cutting points as indicated. But it is characteristic of all of them that shearing stresses during cutting are substantially relieved with respect to the bits and that bit breakage is minimized. The head of the bit structure of FIG. 10 of course is incapable of turning movement.

While a particular type of resilient holding means has been described in this case, other types of holding means can be employed without departing from the spirit of the invention.

Thus far, the bits described have been designed for insertion in a perforation of a lug or socket member. In FIG. 11 there is shown a bit holder 61 welded as at 62 to the face of a cutting head or cutting wheel 63. The holder has an angularly related nose portion 64 which has a frusto-conical shape. The bit 65 in this instance has a body which is conical; but it also has an interior conical recess 66 which is adapted to be placed over the conical nose 64 of the holder. The bit 65 may be made in the form of a semi-pierced forging and it may be retained on the nose 64 by the wedging action of one cone inside another. Actual fastening means may be used if desired, as hereinafter set forth. The bit 65 like all other bits described herein, will preferably be provided with a hard alloy cutting point 67.

However, in this structure also the primary cutting stresses lie at a small angle to the axis of the bit and of the holder so that bit breakage is greatly minimized. Also, less metal is consumed in the manufacture of the bit itself.

A modified structure is shown in FIG. 12. Here a lug element 68 is fastened to a cutter wheel or a cutter arm 69 by welding or in any other suitbale way. It is provided with a conical bore 70 to accept the conical shank 71 of a holding means, which may be fastened permanently in place by a nut 72. The holding means has a head portion consisting of a first conical portion 73 and a second conical member 74 of somewhat smaller diameter. The bit is generally similar to that described in connection with FIG. 11, but its central opening has parts configured to respond to the contour of the holding portions 73 and 74. If a latching means is desired, use may be made of a spring element 75 which will abut against the shoulder between elements 73 and 74 at one end and against interior shoulders 76 on the bit.

FIG. 13 shows a lug member 77 welded as at 78 to a cutter wheel or cutter arm 79. The lug has a conical bore 80 into which the conical shank 81 of a bit holder may be inserted. Again the bit holder may be held in place by a nut 82 or other equivalent means.

The bit holder has a conical nose 83 characterized by a ridge 84 formed intermediate its ends. The bit 85 is in the form of a hollow conical member the inside surfaces of which are configured to correspond with the surfaces of the nose of the bit holder. As shown in FIG. 14, the bit 85 will have in this instance one or more radial cuts 86 extending from its bottom edge toward its point but preferably terminating short of the end of the nose. The skirt portion of the bit is thus divided into one or a plurality of tines by the cuts 86. The bit may be made as a semi-pierced forging, but will then be hardened to a spring temper. It will now be evident from FIGS. 13 and 14 that the tine or tines of the bit can expand resiliently until they pass over the annular ridge 84 of the bit holder. Thereafter they will spring inwardly engaging behind that portion of the ridge which is diminishing in diameter toward the rear. The bit will be held against accidental dislodgment. Preferably the bit is so configured that there will be a space 87 between it and the face of the lug. A prying tool operated in this space will serve to remove the bit by a reversal of the spring action above described.

It is characteristic of the structures of FIGS. 12, 13 and 14 as well as of the structures hereinafter described, that the bit may move or rotate about its axis on the bit holder. While the bit holder has been shown as a biconical element engaged in a particular type of lug, this is not a necessary limitation. FIG. 15 shows a bit holding nose portion 88 similar to that of FIG. 12 but integral with a shank 89 of a type suitable for use in a conventional lug. The shank has a gauge-determining abutment 90 and preferably a pry-out shoulder 91. Otherwise it is configured for use with resilient retaining means in the lug as described in the patent to which reference has been made. FIG. 16, in a similar way shows a bit holding nose portion 92 integral with a shank 93 capable of use in a conventional lug. Rearward vertical portions 127 in FIG. 15 and 128 in FIG. 16 may be employed like the abutment 58 in FIG. 10 to engage an abutment such as 125 in the last mentioned figure and for the purpose there set forth. This is also true of the head portions 95, 101, 108 and 114 in FIGS. 18, 21, 23 and 25.

FIG. 18 shows a shank element 94 having an enlarged upper end or head portion 95 to which there is attached a conical bit holder 96. The bit 97 is again a hollow conical member adapted to be placed on the nose of the bit holder and held against accidental loss. The bit holder nose 96 is provided with a relatively small annular groove 98. As will be evident from FIGS. 19 and 20 the bit 97 is provided with an interior spring wire element 99 extending across the interior hollow of the bit. This wire member is preferably fastened to the bit at one end so that it will be free to deflect when the bit is placed over the nose 96. The spring wire element 99 will eventually enter the groove 98 and will hold the bit in position while permitting its rotation. The strains of cutting will be sustained by the engagement of the bit with the nose 96.

In FIG. 21 a conventional shank 100 is integral with a head 101 and a conical bit mounting nose 102. The nose in this instance has an annular groove 103. The bit 104 as shown in FIG. 22 is provided with a spring tine portion 105 which has a detent part 106 adapted to enter the groove 103 when the bit is installed upon the bit retaining nose.

In FIG. 23 a shank 107 has an integral head portion 108 and a conical bit retaining nose 109. The nose has an annular groove 110 near its bottom. The bit 111 is again of hollow configuration having an interior surface corresponding generally to that of the nose 109. But as shown in FIG. 24 the skirt of the bit is cut to provide a tine 112. This tine, while extending generally in the circumferential direction, is bent inwardly before the bit is given a spring temper. When the bit is installed over the nose 109 the tine 112 will initially be deflected outwardly but when the bit is driven home it will spring into the groove 110 holding the bit in place.

In FIG. 25 a shank 113 has an integral head 114 and an integral conical nose 115. It also is provided with an intermediate shallow annular groove 116. The bit 117 has a matching interior groove 118.

The structure shown in FIG. 25 is adapted to be used with spring wire clips such as the element 119 of FIG. 26 or the element 120 of FIG. 27. The spring clips may take various forms; but preferably they are so shaped that they may be installed in the groove 118 of the bit. As so installed one or more portions of the spring clip will extend outside the groove 118. When the bit is installed the conical nose 115 will first deflect any such extending portions; but when the bit is in its final position such portions will enter the groove 116 in the nose 115, and the bit will be held against accidental loss.

Spring members as illustrated in FIGS. 12, 26 and 27 are intended to be expendable. When the bit is pried away from the bit holding nose, any portions of the spring clip which cannot be deflected will be sheared away.

FIGS. 18, 19, 22, 23 and 25 illustrate a useful method of attaching a hard cutting alloy tip to the bits of this invention. The bits may be counterbored as at 121 in FIG. 25 and a cutting alloy element having a cylindrical portion 122 to enter the counterbore and a tapering cutting tip 123 may be placed in position as shown and brazed to the bit. The conical or tapering shape of the bit body will permit the use of the cutting tip until substantially all of it has worn away. The cutting tip of hard alloy may, if desired, be carried through the end of the bit so as to bottom on the end of the nose of the bit holder.

Where free rotation of the bits is desired as in FIGS. 12 to 25, it will be understood that a wedging action is to be avoided. As a consequence the tip of the nose of the bit holder should engage the inner end portion of the hollow bit so as to relieve the wedging action. Reference to FIG. 17 will show an assembly comprising a bit holder having a shank 129 and a nose 130, together with a hollow bit element 131. The end of the nose 130 may be provided with an insert 132 of hard alloy to minimize wear on the end of the nose. No resilient attaching means has been shown in FIG. 17, but such means have hereinabove been described in connection with FIGS. 12, 13, and 18 through 25 inclusive.

FIG. 17 also shows a modification of the external bit shape which will serve to save metal. Here the bit near its tip has a taper 133 which changes intermediate the length of the bit to a more gentle taper 134 or even to a substantially cylindrical configuration. The external bit shape shown in FIG. 17 can be applied to any of the bits illustrated herein including those of FIGS. 1 to 5 and 8 as well as the hollow bits elsewhere disclosed herein; and the term "tapered" or "conical" is intended to be broad enough to cover this.

Figure 28:
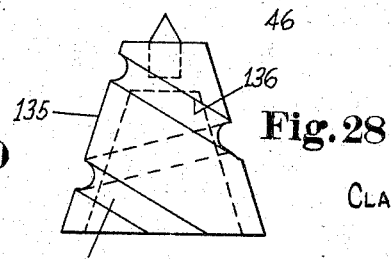
FIG. 28 is an elevational view of a bit having means for assisting the turning or rotation thereof.

Again where rotation of the bit is desired, an expedient may be employed such as shown in FIG. 28. Here the bit element 135 having a conical exterior is provided with a helical groove 136 which upon engagement with the mineral being cut will tend to cause a more positive rotation of the bit.

Modifications may be made in the invention without departing from the spirit of it.

The embodiments of the invention in which an exclusive property or privilege is claimed are defined as follows:

1. In a mining machine, a bit comprising a head means, said head means having a hard cutting point and being substantially conical in shape, lug means for moving said head means in a cutting direction against the face of a mineral to be cut, means for connecting said head means and said lug means, a resilient retainer providing a snap-on, pry-off connection between at least two of said means, said head means being maintained in a position in which its axis lies at an angle of less than 90° to the direction of said motion, the relationship of said head means and said lug means when connected being such as to permit free rotation of said head means with respect to said lug means.

2. The structure claimed in claim 1 wherein said means for connecting said head means and said lug means comprises a shank element in association with said head means.

3. The structure claimed in claim 1 in which said head means has exteriorly a spiral groove to assist in the turning of said head element.

4. The structure claimed in claim 1 in which said tapered head means has a portion adjacent said point which has a relatively higher degree of taper and another adjacent portion having a relatively lower degree of taper.

5. The structure claimed in claim 2 wherein said shank element is a member of circular cross section adapted to be received in a perforation in said lug means, said shank element having an annular notch therein, and said resilient retaining means having a portion for engaging in said notch.

6. The structure claimed in claim 2 wherein said shank element constitutes another tapered head means with a hard cutting point, both of said head means having annular notches therein, said lug means having a perforation to receive said head means alternatively, said resilient retainer having a portion to enter one of said notches to hold said bit to said lug means.

7. The structure claimed in claim 2 wherein said shank element has substantially a rectangular configuration characterized by a notch for engagement by said resilient retainer.

8. The structure claimed in claim 2 wherein said shank element has substantially a rectangular configuration characterized by a notch for engagement by said resilient retainer, wherein said shank element is configured to provide an abutment, in combination with said lug means having a perforation to receive said shank element and an abutment surface for coaction with said first mentioned abutment.

9. The structure claimed in claim 2 wherein said head means is in the form of a hollow cone and wherein said shank element has a nose portion to enter the hollow interior of said cone and another portion to be engaged by said lugs means.

10. The structure claimed in claim 9 wherein the nose portion of said shank element abuts an end surface of the hollow interior of said cone to minimize a wedging action.

11. The structure claimed in claim 9 which is characterized by a snap-on connection between said hollow conical head element means and the portion of said shank element which enters the hollow of said head means.

12. The structure claimed in claim 9 including a snap-on, pry-off interconnection between the said head element and the nose portion of said shank means.

13. The structure claimed in claim 12 in which the nose portion of said shank element is configured to provide abutment means and a resilient member is engaged between the said nose portion and the hollow interior of said head means.

14. The structure claimed in claim 13 in which said nose portion is configured to provide engagement means, in which the hollow interior of said head means is configured to embrace said engagement means, and in which the said head means at its base at least is configured and tempered to provide a resilient engagement between said head means and said nose portion by engaging said engagement means.

15. A bit element having a hollow conical body portion, the hollow interior of said portion having substantially a conical shape, in combination with a bit holder having a nose to extend within the hollow of said bit and configured to bottom at the inner end of said hollow whereby to minimize wedging action and means for releasably maintaining said nose within said hollow.

16. The structure claimed in claim 15 wherein the end of said nose portion has a hard alloy insert to minimize wear.

References Cited

UNITED STATES PATENTS

| | | | |
|---|---|---|---|
| 1,550,669 | 8/1925 | Bowman | 299—86 |
| 1,774,006 | 8/1930 | Hess | 299—91 X |
| 1,860,587 | 5/1932 | Metzger | 175—377 X |
| 2,336,095 | 12/1943 | Heding | 279—79 |
| 2,620,686 | 12/1952 | Peter | 175—369 X |
| 2,915,290 | 12/1959 | Peterson | 299—91 X |
| 2,996,291 | 8/1961 | Krekeler | 299—92 |
| 3,027,953 | 4/1962 | Coski | 37—142 X |
| 3,049,824 | 8/1962 | McIninch | 37—142 X |
| 3,063,691 | 11/1962 | Osgood | 299—92 |
| 3,085,795 | 4/1963 | Snipe et al. | 299—87 |
| 3,093,365 | 6/1963 | Krekeler | 299—92 |
| 3,268,260 | 8/1966 | Snipe | 299—91 |

ERNEST R. PURSER, *Primary Examiner.*